United States Patent Office 3,285,691
Patented Nov. 15, 1966

3,285,691
EPICHLOROHYDRIN AND ACID ANHYDRIDE TREATMENT OF WOOL
Nathan H. Koenig, Berkeley, Calif., assignor to the United States of America as represented by the Secretary of Agriculture
No Drawing. Filed Oct. 28, 1963, Ser. No. 319,613
5 Claims. (Cl. 8—128)

A non-exclusive, irrevocable, royalty-free license in the invention herein described, throughout the world for all purposes of the United States Government, with the power to grant sub-licenses for such purposes, is hereby granted to the Government of the United States of America.

This invention relates broadly to the chemical modification of wool. In particular, the invention concerns and has as its prime object the provision of novel processes wherein wool is chemically modified by reacting it with a mixture of epichlorohydrin and an organic acid anhydride. Further objects of the invention will be apparent from the following description wherein parts and percentages are by weight unless otherwise specified.

Although wool is a very useful fiber it is often desirable to improve its properties for particular applications by chemically modifying it. Various compounds have been proposed for reaction with wool to produce modified fibers. It is known, for example, that wool can be chemically modified by reacting it with epichlorohydrin. It is also known that wool can be chemically modified by reacting it with acid anhydrides.

It has now been found that when wool is reacted with a mixture containing both epichlorohydrin and an acid anhydride, superior results are attained as compared with the reaction of wool with the individual compounds. A primary advantage of the process of the invention is that it yields an unexpectedly high degree of modification of the wool. This unusual result of the invention is demonstrated by the following comparative experiments:

*Example I*

(a) Reaction of wool with a mixture of epichlorohydrin and acid anhydride:

Dry wool cloth (1.2 g.), epichlorohydrin (7 ml.), and tetrahydrophthalic anhydride (0.5 g.) were heated at 105° C. for 90 minutes. The treated wool was successively extracted with warm acetone and hot ethanol to remove unreacted reagents, then dried. It was found that the increase in the weight of the wool, due to its combination with the epichlorohydrin and acid anhydride, was 55%.

(b) Reaction of wool with acid anhydride:

Dry wool cloth (1.2 g.) and premelted tetrahydrophthalic anhydride (7 g., melting point 100° C.) were heated at 105° C. for 90 minutes. The wool was extracted as described in Part (a) and dried. It was found that the increase in weight of the wool was 3%.

(c) Reaction of wool with epichlorohydrin:

Dry wool cloth (1.2 g.) and epichlorohydrin (7 ml.) were heated at 105° C. for 90 minutes. The wool was extracted as described in Part (a) and dried. The increase in the weight of the wool was 21%.

The above results are summarized below:

| Run | Reagents used | | Increase in weight of wool, percent |
|---|---|---|---|
| | Epichlorohydrin | Acid anhydride | |
| (a) | Yes | Yes | 55 |
| (b) | No | Yes | 3 |
| (c) | Yes | No | 21 |

It is evident from the above data that the process of the invention achieves a degree of modification which is far greater than the expected additive effect. In other words, by employing a mixture containing both the epichlorohydrin and acid anhydride, I obtain a synergistic effect. Since the process of the invention yields wools of an enhanced degree of modification as compared with those prepared under comparable conditions with epichlorohydrin or acid anhydride alone, it has the practical advantage of yielding products which exhibit greater resistance to deleterious agents or influences, such as bleaching agents, acidic conditions, laundering media, etc. Another advantage of the process is that the improvement is essentially permanent; the treated materials do not lose their new properties after long use or cleaning but retain these properties for the life of the material.

Carrying out the process of the invention essentially involves contacting wool with a mixture of epichlorohydrin and acid anhydride. The reaction conditions such as proportion of reagents, specific anhydride used, time, temperature, etc. are not critical and may be varied to suit individual circumstances without changing the basic nature of the invention. The mixture of epichlorohydrin and acid anhydride is generally selected to contain from 10 to 98% of epichlorohydrin and the remainder (90 to 2%) of acid anhydride. The temperature of reaction may be from 50 to 125° C. The reaction rate is increased with increasing temperature and a preferred range to expedite the reaction, yet without damaging the wool, is 100–115° C. It is preferred to carry out the reaction under anhydrous conditions, thereby to ensure reaction of the wool with the modifying agents, epichlorohydrin and acid anhydride, and to avoid side reactions such as hydrolysis of the acid anhydride; however, the reaction can also be applied to wool in its normal undried condition (containing about 12 to 14% water). The degree of modification of the wool is influenced by the proportion of modifying agents taken up by the fiber; that is, the higher the uptake of epichlorohydrin and acid anhydride the greater will be the degree of modification of the wool. In general, the uptake of epichlorohydrin and acid anhydride may be varied from 1 to 100%. The time of reaction will vary depending on such factors as the proportion of modifying agents, temperature of reaction, reactivity of the acid anhydride selected, and the degree of modification desired. In general, the reaction may take anywhere from several minutes to several hours.

After reaction of the wool with the mixture of epichlorohydrin and acid anhydride, the chemically modified wool is treated to remove excess reagents and solvent, if such is used. Thus the wool may be treated as by wringing, passage through squeeze rolls, centrifugation, or the like. In place of such mechanical action, or in addition thereto, the modified wool product may be extracted with a solvent such as trichloroethylene, benzene, acetone, ethanol, carbon tetrachloride, etc. Successive extractions with different solvent may be applied to ensure complete removal of all unreacted materials. The treated wool is then dried in the usual way.

Wool modified in accordance with the invention exhibits advantageous properties over normal wool. For example, the modified wool is more resistant to oxidizing conditions. Such conditions may be encountered in textile mills during bleaching, shrinkproofing, or other finishing processes. Oxidizing environments also occur in use by the action of light and air, and in laundering by bleaching chemicals. The increased resistance to oxidizing conditions has been shown by exposing normal and modified wool samples to solutions of sodium hypochlorite, which is used in commercial bleaches.

The tendency of wool to shrink when subjected to washing in aqueous media has long been a deterrent to the more widespread use of wool. An advantage of the invention is that it yields modified wools which have a decreased tendency to shrink when subjected to washing with conventional soap and water or detergent and water formulations.

Although the properties of the modified wool indicate that actual chemical combination of the wool with the epichlorohydrin and acid anhydride has taken place, it is not known for certain how these chemicals are united with the wool. It is believed, however, that the epichlorohydrin and acid anhydride react with some of the sites on the wool molecule where there are reactive hydrogen atoms, e.g., amino, guanidino, hydroxyl, and phenolic groups. Also, combination of the reactants with the wool may establish cross-links in or between the wool protein molecules that further increase the resistance of the fibers to chemical attack. It may be, however, that other reactions occur and it is not intended to limit the invention to any theoretical basis.

It is to be noted that the reaction in accordance with the invention does not impair the wool fiber for its intended purpose, that is, for producing woven or knitted textiles, garments, etc. The process of the invention may be applied to wool in the form of fibers, as such, or in the form of threads, yarns, slivers, rovings, knitted or woven goods, felts, etc. The wool textiles may be white or dyed goods and may be of all-wool composition or blends of wool with other textile fibers such as cotton, regenerated cellulose, viscose, animal hair, etc.

The acid anhydrides used in accordance with the invention are aptly termed cyclic anhydrides. Thus, they are anhydrides of polybasic acids wherein the characteristic anhydride grouping is linked with the remainder of the compound to form a ring or cyclic configuration. The typical structure of cyclic anhydrides is illustrated by the following examples:

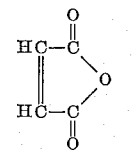
maleic anhydride

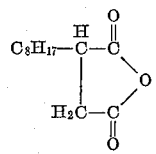
octylsuccinic anhydride

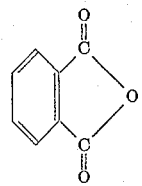
phthalic anhydride

Any of the cyclic anhydrides may be used, typically those of the aliphatic or aromatic series. The compounds may be hydrocarbon cyclic anhydrides or may contain substituents on the hydrocarbon residues such as halogen (chlorine, bromine, iodine, or fluorine), ether groups, ester groups, nitro groups, carboxy groups, etc. Examples of cyclic anhydrides coming within the purview of the invention are listed below by way of illustration and not limitation: maleic anhydride, citraconic anhydride, succinic anhydride, itaconic anhydride, glutaric anhydride, adipic anhydride, pimelic anhydride, suberic anhydride, azelaic anhydride, sebacic anhydride, heptylsuccinic anhydride, octylsuccinic anhydride, decylsuccinic anhydride, dodecylsuccinic anhydride, heptenylsuccinic anhydride, octenylsuccinic anhydride, dodecenylsuccinic anhydride, tetrapropenylsuccinic anhydride, octadecenylsuccinic anhydride, tricosenylsuccinic anhydride, pentatriacontenylsuccinic anhydride, phthalic anhydride, terephthalic anhydride, chlorophthalic anhydride, tetrachlorophthalic anhydride, tetrabromophthalic anhydride, methylphthalic anhydride, nitrophthalic anhydride, trimellitic anhydride, pyromellitic dianhydride, $\Delta^1$-, $\Delta^2$-, $\Delta^3$-, or $\Delta^4$-tetrahydrophthalic anhydrides, hexahydrophthalic a n h y d r i d e, methylbicyclo [2.2.1] heptene-2,3-dicarboxylic anhydride, etc.

Although the invention is applicable to any cyclic anhydride, it is of particular advantage in connection with cyclic anhydrides of higher molecular weight—that is, those containing 8 or more carbon atoms. Such compounds are notorious for their inability to react with wool, using known procedures. However, by applying the process disclosed, such anhydrides react readily to form modified wools of improved properties.

The invention is demonstrated by the illustrative examples given below and that given above (Example I). The tetrahydrophthalic anhydride referred to in Examples I, II, III, and IV was the $\Delta^4$-form which may also be termed cis-4-cyclohexene-1,2-dicarboxylic anhydride.

Example II

A sample of the product of Example I, Part (a)—made by reacting wool with epichlorohydrin and tetrahydrophathalic anhydride—was tested to determine its resistance to hypochlorite. For comparison purposes, the same test was applied to the untreated wool and to the wools modified as disclosed in Example I, Parts (b) and (c), these latter representing wool treated solely with tetrahydrophthalic anhydride or solely with epichlorohydrin.

The hypochlorite resistance test was performed as follows:

A 2-cm. length of yarn was removed from the fabric and placed in a 50-ml. beaker containing 20 ml. of 3% aqueous sodium hypochlorite. The liquid was stirred magnetically until the yarn had dissolved and the elapsed time was noted.

The results tabulated below show the increased resistance to sodium hypochlorite of wool modified in accordance with the invention.

| Reagents used in modifying wool: | Time to dissolve yarn, min. |
|---|---|
| Epichlorohydrin and tetrahydrophthalic anhydride (Example I, (a)) | 64 |
| Tetrahydrophthalic anhydride (Ex. I, (b)) | 3 |
| Epichlorohydrin (Ex. I, (c)) | 10 |
| None (untreated wool) | 3 |

Example III

A sample of the product of Example I, Part (a)—made by reacting wool with epichlorohydrin and tetrahydrophthalic anhydride—was tested to determine its shrinkage characteristics. For purposes of comparison, the same test was applied to a sample of the untreated wool and to the wools modified as disclosed in Example I, Parts (b) and (c), these latter representing wool treated solely with tetrahydrophthalic anhydride or solely with epichlorohydrin.

The shrinkage tests were carried out as follows:

The wool samples were violently agitated in an Accelerator at 1700 r.p.m. for 6 minutes at 40–42° C. with 0.9% sodium oleate solution using a liquor-to-wool ratio of 50 to 1. The area of the samples was measured before and after this laundering process. The improvement in shrinkage properties of wool modified in accordance with the invention is demonstrated by the following data:

| Reagents used in modifying wool: | Area shrinkage, percent |
|---|---|
| Epichlorohydrin and tetrahydrophthalic anhydride (Example I, (a)) | 1 |
| Tetrahydrophthalic anhydride (Ex. I, (b)) | 51 |
| Epichlorohydrin (Ex. I, (c)) | 48 |
| None (untreated wool) | 49 |

Example IV

A 1.2-gram sample of undried wool cloth, containing about 12% moisture, was heated with 7 ml. of epichlorohydrin and 0.2 gram of tetrahydrophthalic anhydride for 90 minutes at 105° C. The treated wool was extracted as in Example I, Part (a), and dried. The increase in the weight of the wool was 31%. A sample of the product was then tested for resistance to sodium hypochlorite according to the procedure of Example II. It took the piece of yarn 41 minutes to dissolve.

*Example V*

A 1.2-gram sample of dry wool cloth was heated with 7 ml. of epichlorohydrin and 0.5 gram of hexahydrophthalic anhydride for 90 minutes at 105° C. The treated wool was extracted as in Example I, Part (a), and dried. The increase in the weight of the wool was 41%. A sample of the product was then tested for shrinkage according to the procedure of Example III. The area shrinkage in this test was 3%.

*Example VI*

A 1.2-gram sample of dry wool cloth was heated with 7 ml. of epichlorohydrin and 0.2 gram of maleic anhydride for 90 minutes at 105° C. The treated wool was extracted as in Example I, Part (a), and dried. The increase in the weight of the wool was 32%. A sample of the product was then tested for resistance to sodium hypochlorite according to the procedure of Example II. It took an average of 31 minutes for the pieces of yarn to dissolve.

*Example VII*

A 1.8-gram sample of dry wool cloth was heated with 8 ml. of epichlorohydrin and 0.5 ml. of citraconic anhydride for 90 minutes at 105° C. The treated wool was extracted as in Example I, Part (a), and dried. The increase in the weight of the wool was 43%. A sample of the product was tested for resistance to sodium hypochlorite according to the procedure of Example II. It took 42 minutes to dissolve the piece of yarn.

Having thus described the invention, what is claimed is:

1. A process for chemically modifying wool which comprises reacting wool under essentially anhydrous conditions with a mixture containing:
   (a) 10 to 98% by weight of epichlorohydrin and
   (b) 90 to 2% by weight of an acid anhydride selected from the group consisting of aromatic cyclic anhydrides and aliphatic cyclic anhydrides.
2. The process of claim 1 wherein the acid anhydride is tretrahydrophthalic anhydride.
3. The process of claim 1 wherein the acid anhydride is maleic anhydride.
4. The process of claim 1 wherein the acid anhydride is citraconic anhydride.
5. The process of claim 1 wherein the acid anhydride is hexahydrophthalic anhydride.

References Cited by the Examiner

UNITED STATES PATENTS

| | | | |
|---|---|---|---|
| 2,131,145 | 9/1938 | Schlack | 8—128 X |
| 2,202,169 | 5/1940 | Schlack | 8—127.6 |
| 2,434,562 | 1/1948 | Harris | 8—128 |
| 2,926,064 | 2/1960 | Rapp | 8—128 |
| 2,986,445 | 5/1961 | Koenig | 8—128 |
| 3,079,215 | 2/1963 | Koenig | 8—128 |
| 3,097,052 | 7/1963 | Koenig | 8—128 |
| 3,156,522 | 11/1964 | Koenig | 8—127.6 |

NORMAN G. TORCHIN, *Primary Examiner.*

J. CANNON, *Assistant Examiner.*